US012725811B2

(12) United States Patent
Matsusue

(10) Patent No.: US 12,725,811 B2
(45) Date of Patent: Sep. 1, 2026

(54) HEAT EXCHANGER

(71) Applicant: TOYOTA JIDOSHA KABUSHIKI KAISHA, Toyota (JP)

(72) Inventor: Masaaki Matsusue, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 19/004,792

(22) Filed: Dec. 30, 2024

(65) Prior Publication Data

US 2025/0239633 A1 Jul. 24, 2025

(30) Foreign Application Priority Data

Jan. 23, 2024 (JP) ................................ 2024-007846

(51) Int. Cl.
*H01M 8/04007* (2016.01)
*H01M 8/04029* (2016.01)

(52) U.S. Cl.
CPC ... *H01M 8/04067* (2013.01); *H01M 8/04029* (2013.01); *H01M 2250/20* (2013.01)

(58) Field of Classification Search
CPC ............. F28D 7/103; H01M 8/04067; H01M 8/04029
See application file for complete search history.

(56) References Cited

U.S. PATENT DOCUMENTS 3,561,417 A * 2/1971 Downey ................ F01M 11/03 123/196 AB
4,059,882 A * 11/1977 Wunder .................. F28D 7/103 228/183
4,089,370 A * 5/1978 Marchal .................... F28D 9/04 165/163
2003/0177771 A1* 9/2003 Maisotsenko ............ F28D 5/00 62/121
2009/0087707 A1* 4/2009 Indersie .................. F28D 7/103 429/495
2017/0256804 A1* 9/2017 Miller ............... H01M 8/04753
2022/0407092 A1* 12/2022 Bang ....................... C01B 3/323
2023/0030209 A1* 2/2023 Martelli ........... H01M 8/04097
2023/0420711 A1* 12/2023 Yamada ........... H01M 8/04537

FOREIGN PATENT DOCUMENTS

JP 2004156825 A 6/2004
JP 2008204834 A * 9/2008
JP 2019085288 A 6/2019

* cited by examiner

*Primary Examiner* — Devon Lane
(74) *Attorney, Agent, or Firm* — Dickinson Wright, PLLC

(57) ABSTRACT

A heat exchanger may include: a first flow path; a second flow path exchanging heat with the first flow path; a third flow path exchanging heat with the second flow path; and a fourth exchanging heat with the third flow path, wherein each of the first and the third flow path may be connected to one of a flow path for fuel gas to be supplied to a fuel cell and a flow path for cooling water to be supplied to the fuel cell; and each of the second and the fourth flow path may be connected to one of the followings: a flow path for fuel off-gas discharged from the fuel cell, a flow path for oxidant gas to be supplied to the fuel cell, a flow path for oxidant off-gas discharged from the fuel cell, and a flow path for cooling water discharged from the fuel cell.

5 Claims, 6 Drawing Sheets

100
12
Fuel Cell Stack
Radiator
P
24
20
26
22
16
28
30
10
10a
10b
14
18
32
34
36
38
II
II

HEAT EXCHANGER

REFERENCE TO RELATED APPLICATION

This application claims priority to Japanese Patent Application No. 2024-007846 filed on Jan. 23, 2024. The entire content of the priority application is incorporated herein by reference.

BACKGROUND

The technology disclosed herein relates to a heat exchanger for fuel cell. Japanese Patent Application Publication No. 2008-204834 describes a heat exchanger for a fuel cell. The heat exchanger includes a first flow path through which a relatively low temperature fluid flows and second, third, and fourth flow paths through which a relatively high temperature fluid flows. The second flow path is adjacent to the first flow path and exchanges heat with the first flow path, the third flow path is adjacent to the first flow path and exchanges heat with the first flow path, and the fourth flow path is adjacent to the first flow path and exchanges heat with the first flow path.

SUMMARY

In the heat exchanger described above, the three flow paths are disproportionately arranged with respect to one flow path to exchange heat therewith. Therefore, the overall size of the heat exchanger is relatively large. The disclosure herein provides a technology that prevents an unnecessary increase in the size of a heat exchanger.

The technology disclosed herein is embodied as a heat exchanger for a fuel cell. In a first aspect of the technology, a heat exchanger may comprise: a first flow path; a second flow path adjacent to the first flow path and exchanging heat with the first flow path; a third flow path adjacent to the second flow path and exchanging heat with the second flow path; and a fourth flow path adjacent to the third flow path and exchanging heat with the third flow path, wherein each of the first flow path and the third flow path may be connected to one of a flow path for fuel gas to be supplied to a fuel cell and a flow path for cooling water to be supplied to the fuel cell; and each of the second flow path and the fourth flow path may be connected to one of the followings: a flow path for fuel off-gas discharged from the fuel cell, a flow path for oxidant gas to be supplied to the fuel cell, a flow path for oxidant off-gas discharged from the fuel cell, and a flow path for cooling water discharged from the fuel cell.

In the heat exchanger described above, each of the first and third flow paths is connected to one of a flow path for fuel gas to be supplied to the fuel cell and a flow path for cooling water to be supplied to the fuel cell. Conversely, each of the second and fourth flow paths is connected one of a flow path for fuel off-gas discharged from the fuel cell, a flow path for oxidant gas to be supplied to the fuel cell, a flow path for oxidant off-gas discharged from the fuel cell, and a flow path for cooling water discharged from the fuel cell. That is, a relatively low temperature fluid flows through each of the first and third flow paths, whereas a relatively high temperature fluid flows through each of the second and fourth flow paths. This configuration allows for efficient heat exchange between two adjacent flow paths since the flow paths through which the low-temperature fluid flows and the flow paths through which the high-temperature fluid flows are arranged alternately. This prevents an unnecessary increase in the size of the heat exchanger.

In a second aspect of the technology according to the first aspect, the first flow path may also be adjacent to the fourth flow path and also exchange heat with the fourth flow path. According to this configuration, the other two flow paths can be adjacent to all of the first through fourth flow paths. This allows for more efficient heat exchange and thus allows for a reduction in the size of the heat exchanger.

In a third aspect of the technology according to the first or second aspect, the second flow path and the third flow path may be surrounded by at least one of the first flow path and the fourth flow path. This configuration increases an area where the first flow path is adjacent to the second flow path and/or an area where the fourth flow path is adjacent to the third flow path and thus increases the efficiency of heat exchange. In addition, the configuration suppresses the second and third flow paths from unnecessarily exchanging heat with the outside.

In a fourth aspect of the technology according to the third aspect, the first flow path, the second flow path, the third flow path and the fourth flow path may be arranged concentrically. This configuration allows all of the first to fourth flow paths to be adjacent to the other flow path(s) over larger areas and thus increases the efficiency of heat exchange. In addition, the configuration suppresses the flow paths (except for the outermost flow path) from unnecessarily exchanging heat with the outside.

In a fifth aspect of the technology according to any one of the first to fourth aspects, the first flow path may be connected to the flow path for the fuel gas, the second flow path may be connected to the flow path for the discharged cooling water, the third flow path may be connected to the flow path for the cooling water to be supplied, and the fourth flow path may be connected to the flow path for the oxidant gas. According to this configuration, in the arrangement of the above four flow paths of the heat exchanger, the two flow paths through which the cooling water flows are centrally located in the arrangement. Compared to gasses such as fuel gas and its off-gas, cooling water, which is a liquid, has a relatively high heat exchange capacity. Therefore, the arrangement in which the two flow paths through which the cooling water flows are centrally arranged in the array of the four flow paths increases the efficiency of heat exchange effectively.

DESCRIPTION

First Embodiment

Figure 1:
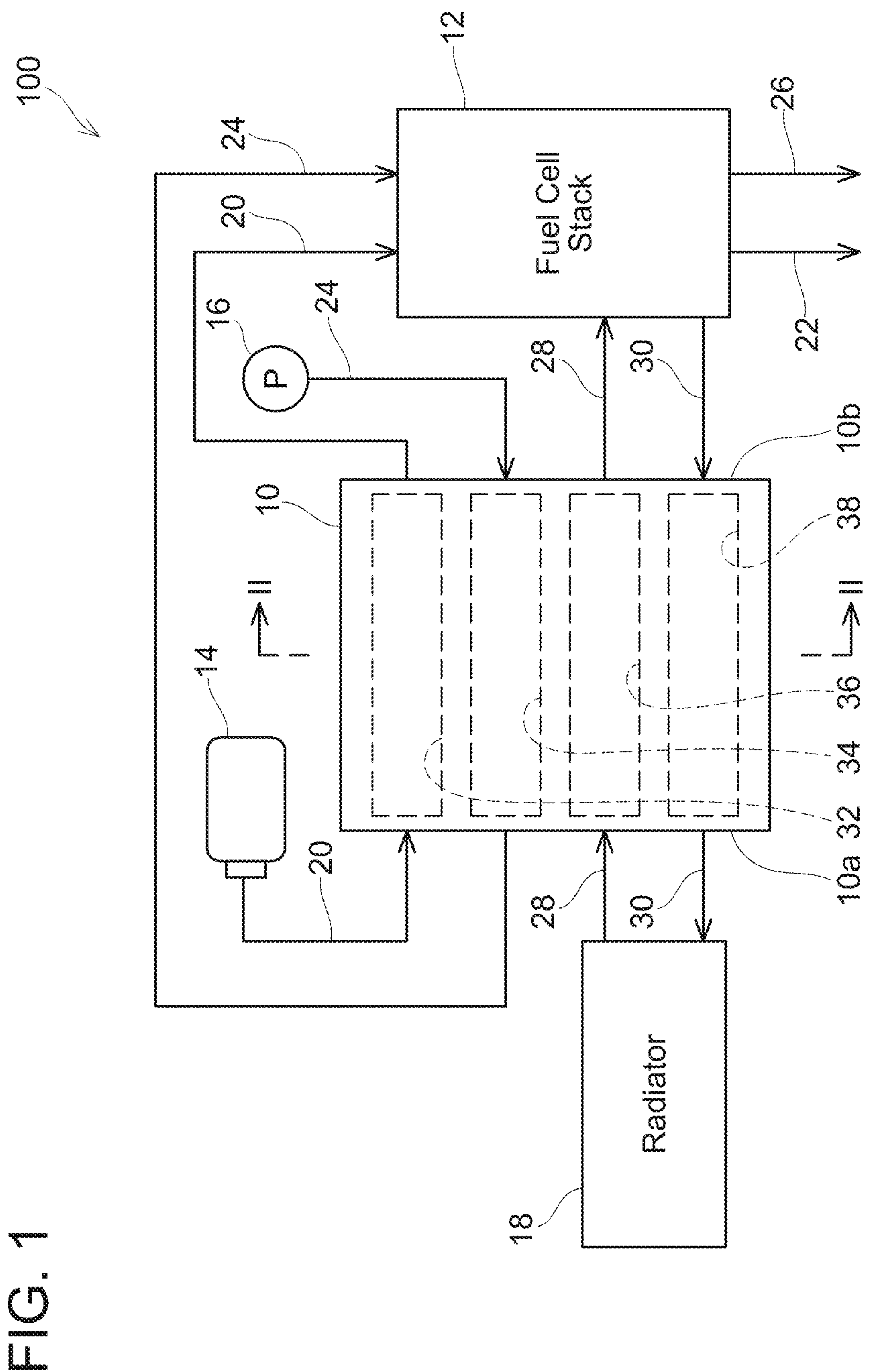
FIG. 1 shows a configuration of a fuel cell system.
Figure 2:
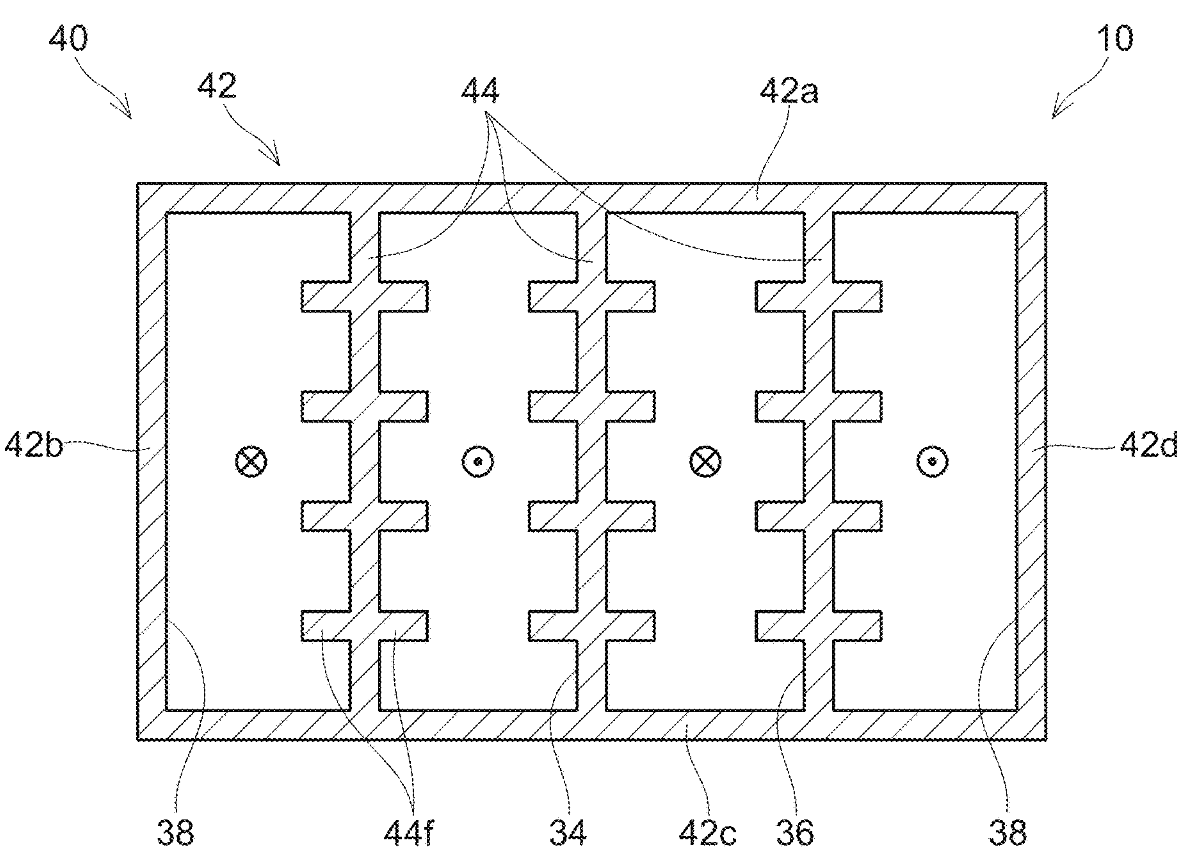
FIG. 2 shows a cross-sectional view of a heat exchanger according to a first embodiment at line II-II in FIG. 1.

Referring to FIGS. 1 and 2, a heat exchanger 10 according to a first embodiment is described. As shown in FIG. 1, the heat exchanger 10 is used in a fuel cell system 100. In one example, the fuel cell system 100 is installed in an electric vehicle. The fuel cell system 100 supplies generated electric power to the traction motor of the electric vehicle. Alternatively, the fuel cell system 100 charges the battery of the electric vehicle with generated electric power. The heat exchanger 10 in the present technology may not be installed in an electric vehicle but may be installed in another mobility device equipped with a fuel cell stack.

In addition to the heat exchanger 10, the fuel cell system 100 also includes a fuel cell stack 12, a fuel gas supply 14, an oxidant gas supply 16, a radiator 18, and a plurality of flow paths 20, 22, 24, 26, 28, 30.

Fuel gas and oxidant gas are supplied to the fuel cell stack 12. In this embodiment, the fuel gas is hydrogen and the oxidant gas is air (oxygen). The fuel cell stack 12 includes a plurality of fuel cells (not shown). In each of the plurality of fuel cells (hereinafter simply referred to as "cells"), electric power is generated through the reaction between the supplied fuel gas and oxidant gas.

Each of the plurality of flow paths 20, 22, 24, 26, 28, 30 is connected to the fuel cell stack 12. The plurality of flow paths 20, 22, 24, 26, 28, 30 include a fuel gas flow path 20, a fuel off-gas flow path 22, an oxidant gas flow path 24, an oxidant off-gas flow path 26, a first cooling water flow path 28, and a second cooling water flow path 30. The fuel gas flow path 20 is a flow path for the fuel gas to be supplied to the fuel cell stack 12. The fuel off-gas flow path 22 is a flow path for fuel off-gas discharged from the fuel cell stack 12. The oxidant gas flow path 24 is a flow path for the oxidant gas to be supplied to the fuel cell stack 12. The oxidant off-gas flow path 26 is a flow path for oxidant off-gas discharged from the fuel cell stack 12. The first cooling water flow path 28 is a flow path for cooling water to be supplied to the fuel cell stack 12. The second cooling water flow path 30 is a flow path for cooling water discharged from the fuel cell stack 12.

After flowing through the cells, the fuel gas is discharged as fuel off-gas from the fuel cell stack 12 through the fuel off-gas flow path 22. After flowing through the cells, the oxidant gas is discharged as oxidant off-gas from the fuel cell stack 12 through the fuel off-gas flow path 22. The fuel off-gas and oxidant off-gas flowing through the fuel off-gas flow path 22 and oxidant off-gas flow path 26 have relatively high temperature due to the heating from reactions in the fuel cell stack compared to fluids flowing in the other flow paths of the fuel cell system 100.

The fuel off-gas flow path 22 may be connected to a gas-liquid separator (not shown), and impurities such as water produced by reactions in each cell may be removed by the gas-liquid separator, although this need not be the case. The fuel off-gas discharged from the fuel cell stack 12 may be returned to the fuel gas flow path 20 via the gas-liquid separator.

The fuel gas supply 14 includes a fuel gas tank that stores the fuel gas. The fuel gas supply 14 is connected to the fuel cell stack 12 via the fuel gas flow path 20. The fuel gas supply 14 supplies the fuel gas stored in the fuel gas tank to the fuel cell stack 12. The fuel gas flowing through the fuel gas flow path 20 has a relatively low temperature.

The oxidant gas supply 16 includes a compressor that delivers the oxidant gas. The oxidant gas supply 16 is connected to the fuel cell stack 12 via the oxidant gas flow path 24. The oxidant gas supply 16 compresses the outside air by the compressor and supplies air as an oxidant to the fuel cell stack 12. The oxidant gas flowing through the oxidant gas flow path 24 has a relatively high temperature due to the compression by the compressor.

The radiator 18 is a heat exchanger that exchanges heat between the outside air and the cooling water. The radiator 18 is connected to the first cooling water flow path 28. Thus, the radiator 18 is connected to the fuel cell stack 12 via the first cooling water flow path 28. The cooling water supplied from the radiator 18 flows through the first cooling water flow path 28 toward the fuel cell stack 12. The cooling water flowing through the first cooling water flow path 28 has a relatively low temperature since it is cooled by the radiator. The radiator 18 is connected to the second cooling water flow path 30. Thus, the radiator 18 is connected to the fuel cell stack 12 via the second cooling water flow path 30. The cooling water discharged from the fuel cell stack 12 flows through the second cooling water flow path 30 toward the radiator 18. Thus, the cooling water flowing through the second cooling water flow path 30 has a relatively high temperature since it is heated in the fuel cell stack 12. A pump (not shown) is provided between the radiator 18 and the fuel cell stack 12 to circulate the cooling water between them.

As shown in FIGS. 1 and 2, the heat exchanger 10 includes a first end 10*a*, a second end 10*b*, and a plurality of flow paths 32, 34, 36, 38 extending between the first end 10*a* and the second end 10*b*. The flow paths 32, 34, 36, 38 extend parallel to each other. The plurality of flow paths 32, 34, 36, 38 includes a first flow path 32, a second flow path 34, a third flow path 36, and a fourth flow path 38. The second flow path 34 is adjacent to the first flow path 32 and exchanges heat with the first flow path 32. The third flow path 36 is adjacent to the second flow path 34 and exchanges heat with the second flow path 34. The fourth flow path 38 is adjacent to the third flow path 36 and exchanges heat with the third flow path 36. The flow paths 32, 34, 36, 38 are aligned in a line in the order of the first flow path 32, the second flow path 34, the third flow path 36, and the fourth flow path 38.

The first flow path 32 is connected to the fuel gas flow path 20. Specifically, the fuel gas flow path 20 is divided into an upstream portion and a downstream portion by the first flow path 32. More specifically, the downstream end of the upstream portion of the fuel gas flow path 20 is connected to the first flow path 32 at the first end 10*a* of the heat exchanger 10. The upstream end of the downstream portion of the fuel gas flow path 20 is connected to the first flow path 32 at the second end 10*b* of the heat exchanger 10. That is, in the first flow path 32 of the heat exchanger 10, the fluid flows from the first end 10*a* toward the second end 10*b* (toward the back of the drawing in FIG. 2).

The second flow path 34 is connected to the oxidant gas flow path 24. Specifically, the oxidant gas flow path 24 is divided into an upstream portion and a downstream portion by the second flow path 34. More specifically, the downstream end of the upstream portion of the oxidant gas flow path 24 is connected to the second flow path 34 at the second end 10*b* of the heat exchanger 10. The upstream end of the downstream portion of the oxidant gas flow path 24 is connected to the second flow path 34 at the first end 10*a* of the heat exchanger 10. That is, in the second flow path 34 of the heat exchanger 10, the fluid flows from the second end 10*b* toward the first end 10*a* (toward the front of the drawing in FIG. 2).

The third flow path 36 is connected to the first cooling water flow path 28. Specifically, the first cooling water flow path 28 is divided into an upstream portion and a downstream portion by the third flow path 36. More specifically, the downstream end of the upstream portion of the first cooling water flow path 28 is connected to the third flow path 36 at the first end 10*a* of the heat exchanger 10. The upstream end of the downstream portion of the first cooling water flow path 28 is connected to the third flow path 36 at the second end 10*b* of the heat exchanger 10. That is, in the third flow path 36 of the heat exchanger 10, the fluid flows from the first end 10*a* toward the second end 10*b* (toward the back of the drawing in FIG. 2).

The fourth flow path 38 is connected to the second cooling water flow path 30. Specifically, the second cooling water flow path 30 is divided into an upstream portion and a downstream portion by the fourth flow path 38. More specifically, the downstream end of the upstream portion of the second cooling water flow path 30 is connected to the fourth flow path 38 at the second end 10*b* of the heat exchanger 10. The upstream end of the downstream portion of the second cooling water flow path 30 is connected to the fourth flow path 38 at the first end 10*a* of the heat exchanger 10. That is, in the fourth flow path 38 of the heat exchanger 10, the fluid flows from the second end 10*b* toward the first end 10*a* (toward the front of the drawing in FIG. 2).

The heat exchanger 10 includes a casing 40. The casing 40 is a tubular member. The casing 40 includes a peripheral wall 42 defining the tube and a plurality of plate-shaped separation walls 44 located within the peripheral wall 42. The peripheral wall 42 and the plurality of separation walls 44 extend between the first end 10*a* and the second end 10*b* in the heat exchanger 10. The plurality of separation walls 44 defines the first flow path 32, the second flow path 34, the third flow path 36, and the fourth flow path 38 within the peripheral wall 42. The peripheral wall 42 has a generally rectangular cross section and includes a first wall 42*a*, a second wall 42*b*, a third wall 42*c*, and a fourth wall 42*d*. The cross section here refers to the cross section perpendicular to the direction in which the tube defined by the peripheral wall 42 extends. In another embodiment, the peripheral wall 42 may have a polygonal or circular cross section. The first wall 42*a* is opposite the third wall 42*c*, and the second wall 42*b* is opposite the fourth wall 42*d*. The second wall 42*b* and the fourth wall 42*d* extend between the first wall 42*a* and the third wall 42*c*.

The plurality of separation walls 44 extend between the first end 10*a* and the second end 10*b* of the heat exchanger 10. The plurality of separation walls 44 extend between the first wall 42*a* and the third wall 42*c*. The separation walls 44 are arranged at predetermined intervals within the perimeter wall 42. Each of the separation walls 44 includes a plurality of fins 44*f*. The fins 44*f* protrude from both surfaces of each separation wall 44 that face two adjacent flow paths. This increases arear where both the first flow path 32 and the second flow path 34 contact the separation wall 44 and thus increases the efficiency of heat exchange. The shape of the plurality of fins 44*f* is not particularly limited. Each fin 44*f* may have an elongated plate shape or a pin shape.

In the heat exchanger 10 according to this embodiment, the fuel gas flow path 20 for the fuel gas to be supplied to the fuel cell stack 12 is connected to the first flow path 32, and the first cooling water flow path 28 for the cooling water to be supplied to the fuel cell stack 12 is connected to the third flow path 36. In contrast, the oxidant gas flow path 24 for the oxidant gas to be supplied to the fuel cell stack 12 is connected to the second flow path 34, and the second cooling water flow path 30 for the cooling water discharged from the fuel cell stack 12 is connected to the fourth flow path. That is, the fluids having relatively low temperatures flow through the first flow path 32 and the third flow path 36, while the fluids having relatively high temperatures flow through the second flow path 34 and the fourth flow path 38. In this configuration, the flow paths 32 and 36 through which the low-temperature fluids flow and the flow paths 34 and 38 through which the high-temperature fluids flow are arranged alternately, and thus heat is efficiently exchanged between two adjacent flow paths. This suppresses an unnecessary increase in the size of the heat exchanger 10.

In particular, in this embodiment, the flow paths 32, 34, 36, 28 of the heat exchanger 10 are arranged such that the directions of fluids flowing in two adjacent flow paths are opposite to each other. That is, the directions of fluids flowing in the first flow path 32 and the second flow path 34 are opposite to each other, the directions of fluids flowing in the second flow path 34 and the third flow path 36 are opposite to each other, and the directions of fluids flowing in the third flow path 36 and the fourth flow path 38 are opposite to each other. This configuration allows for efficient heat exchange between two adjacent flow paths over a region from the first end 10*a* to the second end 10*b* of the heat exchanger 10. However, in another embodiment, the directions of fluids flowing in two adjacent flow paths may be the same.

Furthermore, in this embodiment, the fuel gas flows in the first flow path 32 and the oxidant gas flows in the second flow path 34. In contrast, the cooling water flows in the third flow path 36 and the fourth flow path 38. That is, the fluids flowing in two adjacent flow paths of the plurality of flow paths 32, 34, 36, and 38 of the heat exchanger 10 are both gasses or water. This configuration allows for efficient heat exchange between the two adjacent flow paths. However, in another embodiment, with respect to two adjacent flow paths, the fluid flowing in one flow path may be a gas and the fluid flowing in the other flow path may be water.

Second Embodiment

Figure 3A:
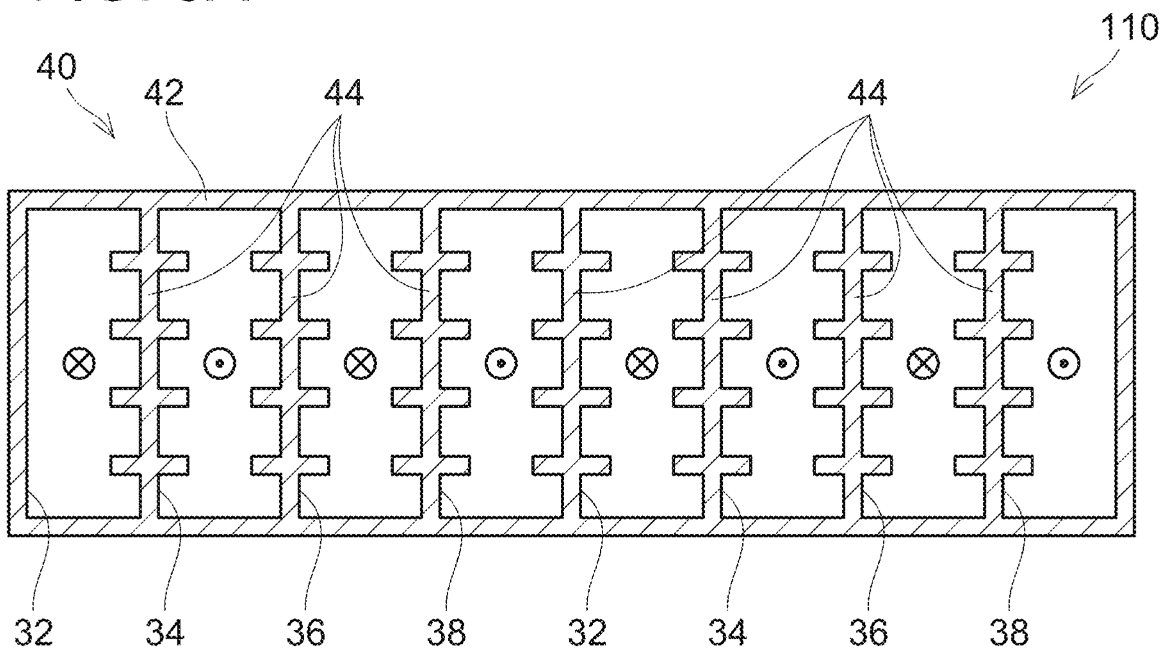
FIG. 3A shows a cross-sectional view of a heat exchanger according to a second embodiment.

Referring to FIG. 3A, a heat exchanger 110 according to a second embodiment is described. As shown in FIG. 3A, the heat exchanger 110 according to the second embodiment includes eight flow paths including two sets of the flow paths 32, 34, 36, and 38, which has been described in connection with the first embodiment, and this is the difference from the heat exchanger 10 according to the first embodiment. Except for this difference, the configuration of the heat exchanger 110 according to the second embodiment is the same as that of the heat exchanger 10 according to the first embodiment. In the configuration according to the second embodiment, the flow paths 32 and 36 through which the low-temperature fluids flow and the flow paths 34 and 38 through which the high-temperature fluids flow are arranged alternately, and thus heat is efficiently exchanged between two adjacent flow paths. The number of the flow paths is not limited to four in the first embodiment or eight in the second embodiment, but may be any number as long as the number is four or more.

Where the two first flow paths 32 are connected to the fuel gas flow path 20 as in the above configuration, the two first flow paths 32 may be connected in parallel to the fuel gas flow path 20. This configuration allows for efficient heat exchange between each of the first flow paths 32 and the adjacent second flow path 34. In another embodiment, the two first flow paths 32 may be connected in series to the fuel gas flow path 20. The two second flow paths 34, the two third flow paths 36, and the two fourth flow paths 38 may be connected in the same manner as the two first flow paths 32.

Third Embodiment

Figure 3B:
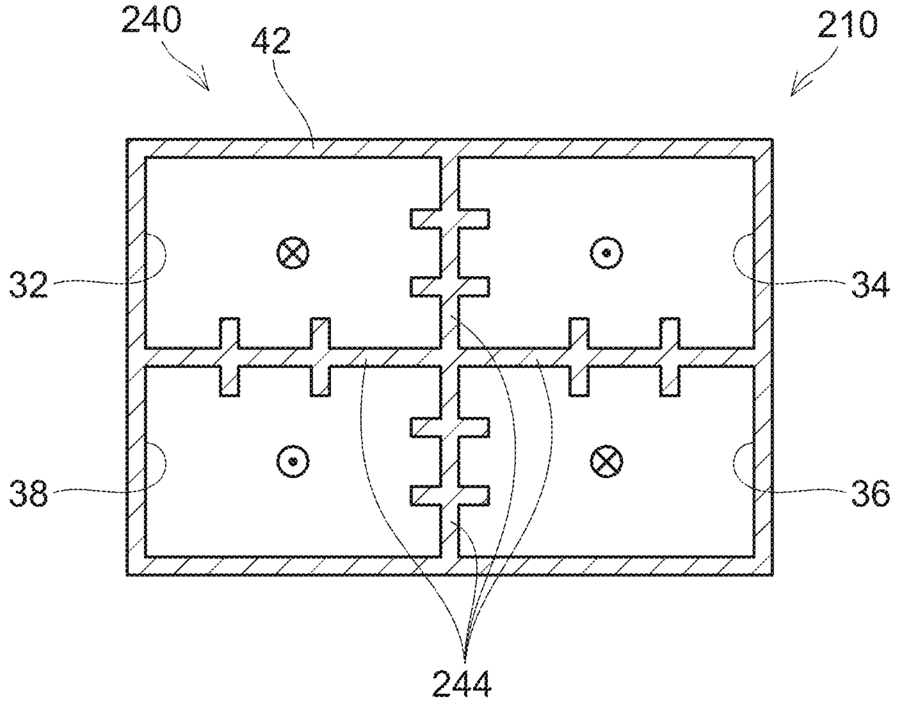
FIG. 3B shows a cross-sectional view of a heat exchanger according to a third embodiment.

Referring to FIG. 3B, a heat exchanger 210 according to a third embodiment is described. As shown in FIG. 3B, in the heat exchanger 210 according to the third embodiment, the arrangement of the plurality of flow paths 32, 34, 36, 38 is different from that of the heat exchanger 10 according to the first embodiment. In the heat exchanger 210, the flow paths 32, 34, 36, 38 are arranged such that the each of the flow paths 32, 34, 36, 38 is adjacent to other two flow paths. The first flow path 32 is adjacent not only to the second flow path 34 but also to the fourth flow path 38. That is, the first flow path 32 can also exchange heat with the fourth flow path 38. In this configuration, all of the flow paths 32, 34, 36, 38 are each adjacent to other two flow paths. This increases the efficiency of heat exchange and thus allows for a reduction in the size of the heat exchanger 210.

Specifically, the heat exchanger 210 includes a casing 240. The casing 240 includes a tubular peripheral wall 42, which is the same one described in connection with the first embodiment, and a plurality of plate-shaped separation walls 244 located within the peripheral wall 42. The separation walls 244 are coupled to each other at one ends thereof, and the other ends of the separation walls 244 are coupled to the peripheral wall 42.

Fourth Embodiment

Figure 4A:
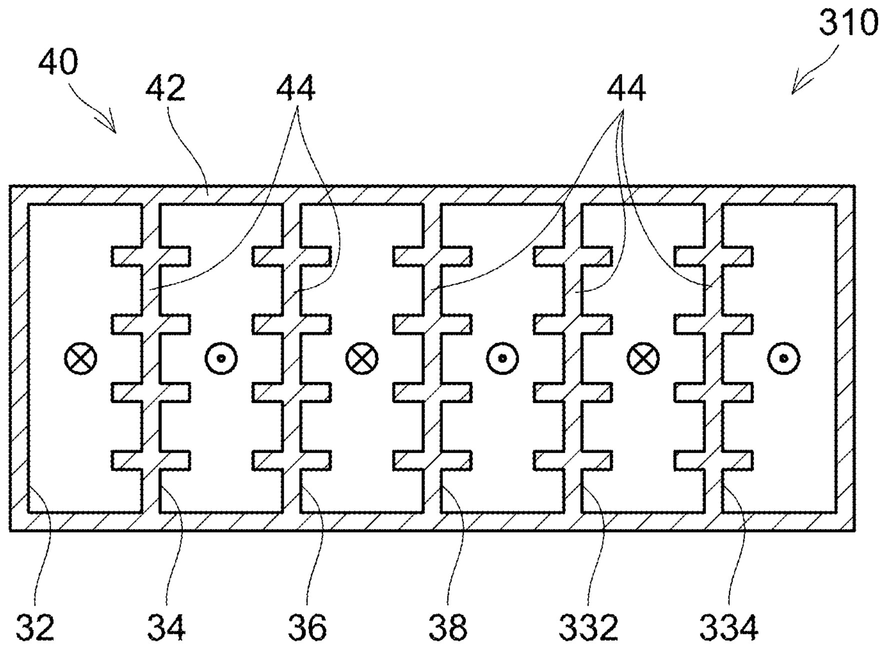
FIG. 4A shows a cross-sectional view of a heat exchanger according to a fourth embodiment.

Referring to FIG. 4A, a heat exchanger 310 according to a fourth embodiment is illustrated. As shown in FIG. 4A, the heat exchanger 310 according to the fourth embodiment includes a second first flow path 332 and a second second flow path 334 in addition to the plurality of flow paths 32, 34, 36, 38 described in connection with the first embodiment. In this respect, the heat exchanger 310 according to the fourth embodiment differs from the heat exchanger 10 according to the first embodiment. The second first flow path 332 is adjacent to the fourth flow path 38 and exchanges heat therewith. The second first flow path 332 is connected to the fuel gas flow path 20, as with the first flow path 32 in the first embodiment. The second second flow path 334 is adjacent to the second first flow path 332 and exchanges heat therewith. The second second flow path 334 is connected to the oxidant gas flow path 24, as with the second flow path 34 in the first embodiment.

In the configuration according to the fourth embodiment, the third flow path 36 and the fourth flow path 38 in which the cooling water flows are centrally located in the arrangement of the flow paths 32, 34, 36, 38, 332, and 334. Compared to the fuel gas and its off-gas, which are gases, the cooling water, which is a liquid, has a relatively high heat exchange capacity. Therefore, the efficiency of heat exchange can be effectively increased by centrally arranging the two flow paths 36 and 38 in which the cooling water flows in the arrangement of the flow paths 32, 34, 36, 38, 332, and 334. The second first flow path 332 in this embodiment is an example of "first flow path" in the present technology. The fourth flow path 38 in this embodiment is an example of "second flow path" in the present technology. The third flow path 36 in this embodiment is an example of "third flow path" in the present technology. The fourth flow path 38 in this embodiment is an example of "fourth flow path" in the present technology.

Fifth Embodiment

Figure 4B:
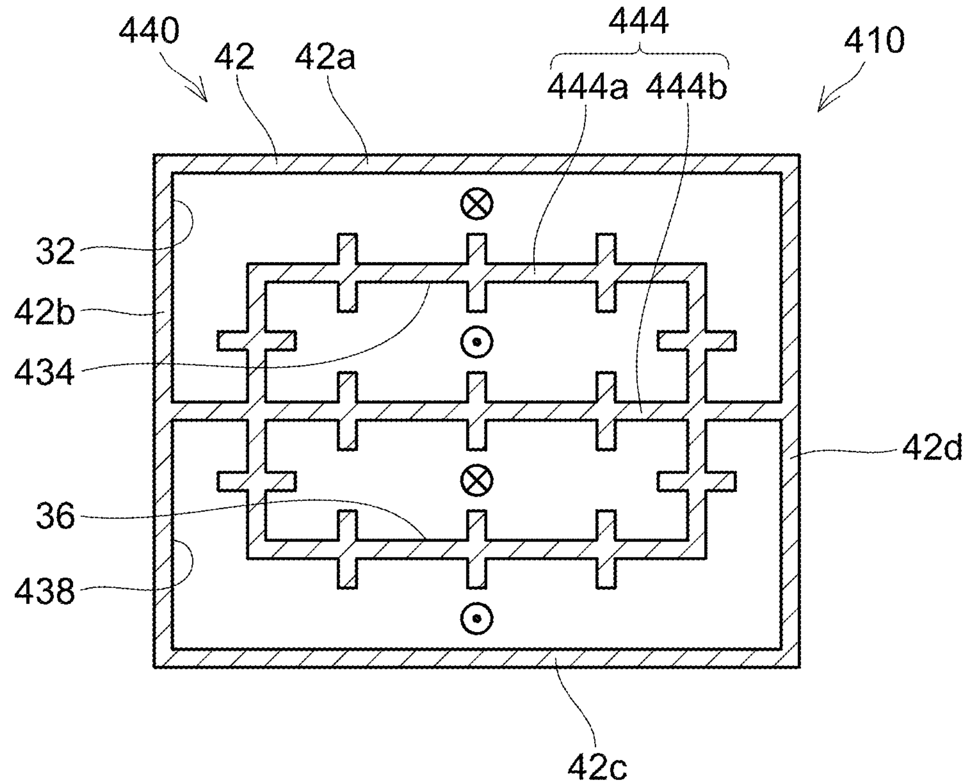
FIG. 4B shows a cross-sectional view of a heat exchanger according to a fifth embodiment.

Referring to FIG. 4B, a heat exchanger 410 according to a fifth embodiment is described. As shown in FIG. 4B, the heat exchanger 410 according to the fifth embodiment includes a plurality of flow paths including a first flow path 32 and a third flow path 36, which are the same ones described in connection with the first embodiment, and a second flow path 434 and a fourth flow path 438. The second flow path 434 is connected to the second cooling water flow path 30. The fourth flow path 438 is connected to the oxidant gas flow path 24. In these respects, the configuration of the heat exchanger 410 according to the fifth embodiment differs from the heat exchanger 10 according to the first embodiment. In the configuration according to the fifth embodiment described above, the two flow paths 434 and 36 in which the cooling water flows are centrally arranged in the arrangement of the four flow paths 32, 434, 36, 438. Thus, the efficiency of heat exchange can be effectively increased.

In the heat exchanger 410 according to the fifth embodiment, the arrangement of the flow paths 32, 434, 36, 438 is also different from that of the heat exchanger 10 according to the first embodiment. The second flow path 434 is adjacent to the first flow path 32 and exchanges heat with the first flow path 32. The third flow path 36 is adjacent to the second flow path 434 and exchanges heat with the second flow path 434. The fourth flow path 438 is adjacent to the third flow path 36 and exchanges heat with the third flow path 36. Furthermore, in the heat exchanger 410, the first flow path 32 is also adjacent to the fourth flow path 438 and also exchanges heat with the fourth flow path 438. In this configuration, all of the flow paths 32, 36, 434, 438 are each adjacent to other two flow paths. This increases the efficiency of heat exchange and thus allows for a reduction in the size of the heat exchanger 410.

In addition, the second flow path 434 is surrounded by the first flow path 32 except for a portion thereof that is adjacent to the third flow path 36. The third flow path 36 is surrounded by the fourth flow path 438 except for a portion thereof that is adjacent to the second flow path 434. In this configuration, the first flow path 32 is adjacent to the second flow path 434 over a large region and the fourth flow path 438 is adjacent to the third flow path 36 over a large region. This increases the efficiency of heat exchange and suppresses the second flow path 434 and the third flow path 36 from unnecessarily exchanging heat with the outside.

The heat exchanger 410 includes a casing 440, although this need not be the case. The casing 440 includes a peripheral wall 42 defining a tube, which is the same one described in connection with the first embodiment, and a plurality of separation walls 444 located within the peripheral wall 42. The plurality of separation walls 444 includes a first separation wall 444*a* defining a tube and a plate-shaped second separation wall 444*b*. The first separation wall 444*a* extends along the inner surface of the peripheral wall 42. The first separation wall 444*a* is separated from the peripheral wall 42. The second separation wall 444*b* extends between the second wall 42*b* and the fourth wall 42*d* of the peripheral wall 42. The second separation wall 444*b* is arranged to divide the space defined by the first separation wall 444*a* and the space defined by the peripheral wall 42.

Sixth Embodiment

Figure 5:
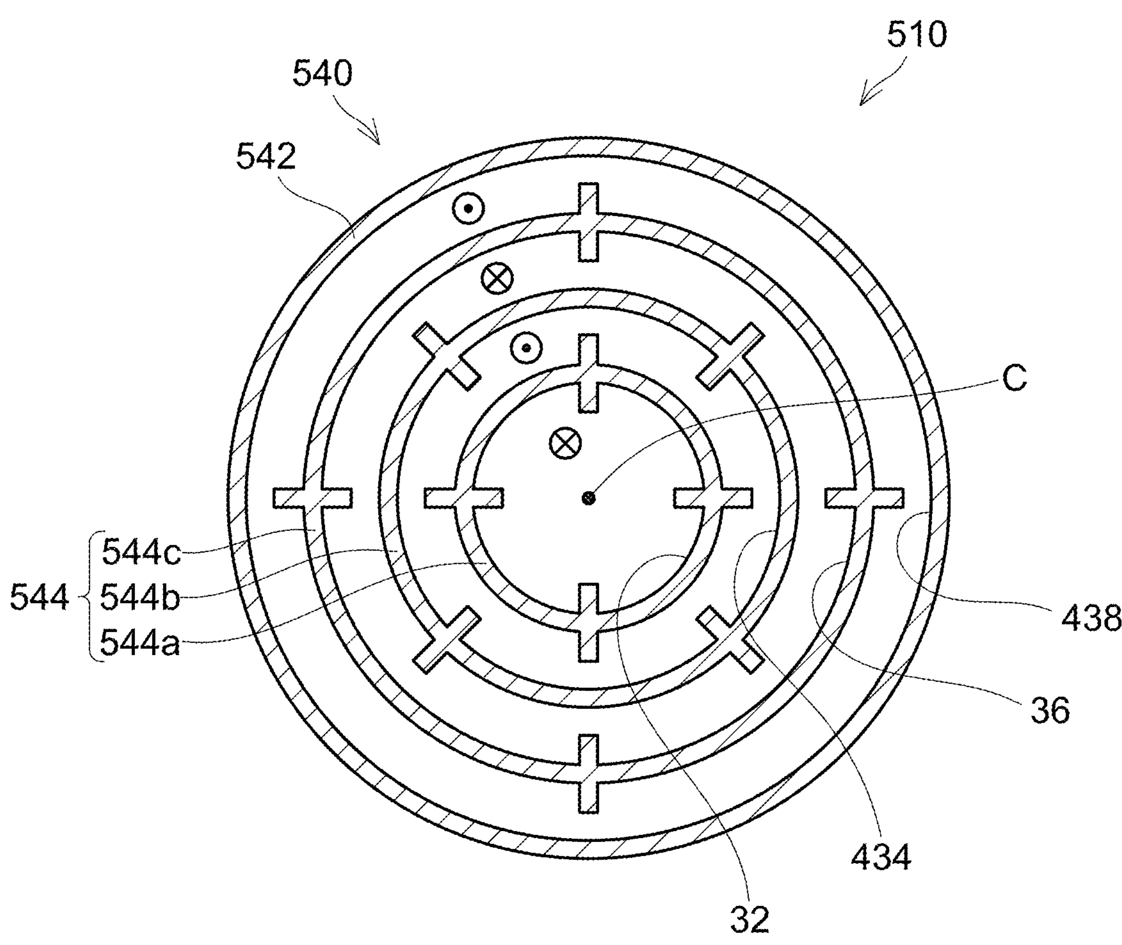
FIG. 5 shows a cross-sectional view of the heat exchanger according to a sixth embodiment.

Referring to FIG. 5, a heat exchanger 510 according to a sixth embodiment is described. As shown in FIG. 5, in the heat exchanger 510 according to the sixth embodiment, the arrangement of the flow paths 32, 434, 36, 438 is different from that of the heat exchanger 410 according to the fifth embodiment. The first flow path 32, the second flow path 434, the third flow path 36, and the fourth flow path 438 all extend along the same central axis C. The first flow path 32 is located innermost, the second flow path 434 is located outward of the first flow path 32, the third flow path 36 is located outward of the second flow path 434, and the fourth flow path 438 is located outward of the third flow path 36. The first flow path 32 is surrounded by the second flow path 434 over the entire circumference. The second flow path 434 is surrounded by the third flow path 36 over the entire circumference. The third flow path 36 is surrounded by the fourth flow path 438 over the entire circumference. Specifically, the first flow path 32, the second flow path 434, the third flow path 36, and the fourth flow path 438 are arranged concentrically about the central axis C. In this configuration, all of the first flow path 32 to the fourth flow path 438 are adjacent to other flow path(s) over large regions. This increases the efficiency of heat exchange and suppresses the flow path 32, 434, 36, except for the fourth flow path located outermost, from unnecessarily exchanging heat with the outside.

In the above arrangement of the four flow paths 32, 434, 36, 438 of the heat exchanger 510, the two flow paths 434 and 36 in which the cooling water flows are centrally arranged in the arrangement. Thus, the efficiency of heat exchange can be effectively increased.

The heat exchanger 510 includes a casing 540, although this need not be the case. The casing 540 includes a peripheral wall 542 defining a cylinder and a plurality of cylindrical separation walls 544 located within the peripheral wall 542. The plurality of separation walls 544 includes a first separation wall 544*a*, a second separation wall 544*b* surrounding the entire circumference of the first separation wall 544*a*, and a third separation wall 544*c* surrounding the entire circumference of the second separation wall 544*b*.

Seventh Embodiment

Figure 6:
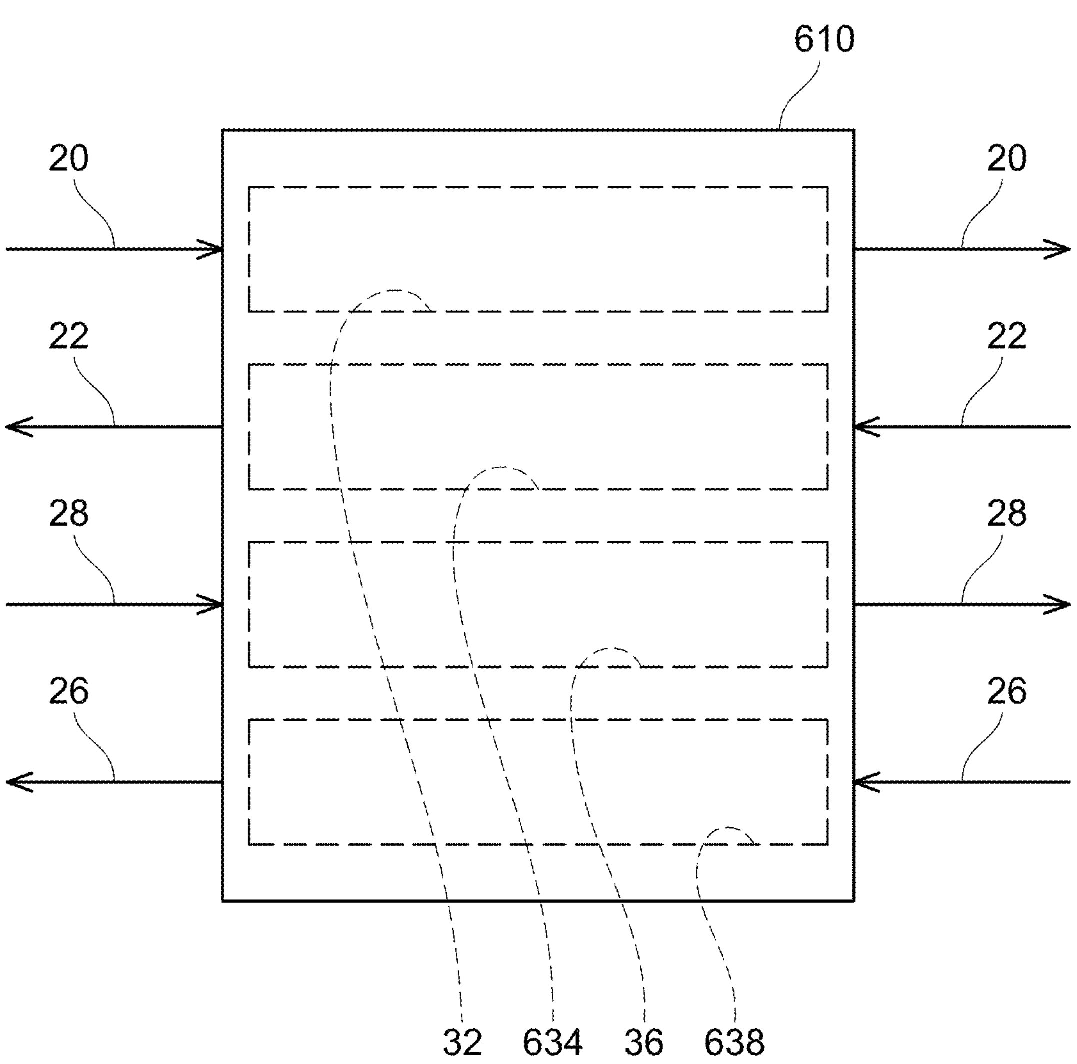
FIG. 6 shows a configuration of a heat exchanger according to a seventh embodiment.

Referring to FIG. 6, a heat exchanger 610 according to a seventh embodiment is described. As shown in FIG. 6, the heat exchanger 610 according to the seventh embodiment includes a plurality of flow paths including a first flow path 32 and a third flow path 36, which are the same ones described in connection with the first embodiment, and a second flow path 634 and a fourth flow path 638. The second flow path 634 is connected to the fuel off-gas flow path 22 and the fourth flow path 638 is connected to the oxidant off-gas flow path 26. In this respect, the heat exchanger 610 according to the sixth embodiment differs from the heat exchanger 10 according to the first embodiment. In this embodiment as well, fluids having relatively low temperatures flow through the first flow path 32 and the third flow path 36, while fluids having relatively high temperatures flow through the second flow path 634 and the fourth flow path 638. Thus, the flow paths 32 and 36 through which the low-temperature fluids flow and the flow paths 634 and 638 through which the high-temperature fluids flow are arranged alternately, allowing for efficient heat exchange between two adjacent flow paths.

The various combinations of flow paths in the heat exchangers 10, 110, 210, 310, 410, 510, and 610 have been described in connection with the first to seventh embodiments, however the combinations of flow paths are not particularly limited. Each of the first and third flow paths may be connected to one of the fuel gas flow path 20 and the first cooling water flow path 28. Each of the second and fourth flow paths may be connected to one of the fuel off-gas flow path 22, the oxidant gas flow path 24, the oxidant off-gas flow path 26, and the second cooling water flow path 30.

What is claimed is:

1. A heat exchanger for a fuel cell, comprising:
- a first flow path;
- a second flow path adjacent to the first flow path and exchanging heat with the first flow path;
- a third flow path adjacent to the second flow path and exchanging heat with the second flow path; and
- a fourth flow path adjacent to the third flow path and exchanging heat with the third flow path,
- wherein each of the first flow path and the third flow path is connected to one of a flow path for fuel gas to be supplied to the fuel cell and a flow path for cooling water to be supplied to the fuel cell; and
- each of the second flow path and the fourth flow path is connected to one of the followings: a flow path for fuel off-gas discharged from the fuel cell, a flow path for oxidant gas to be supplied to the fuel cell, a flow path for oxidant off-gas discharged from the fuel cell, and a flow path for cooling water discharged from the fuel cell.

2. The heat exchanger according to claim 1, wherein the first flow path is also adjacent to the fourth flow path and also exchanges heat with the fourth flow path.

3. The heat exchanger according to claim 1, wherein the second flow path and the third flow path are surrounded by at least one of the first flow path and the fourth flow path.

4. The heat exchanger according to claim 3, wherein the first flow path, the second flow path, the third flow path and the fourth flow path are arranged concentrically.

5. The heat exchanger according to claim 1, wherein
- the first flow path is connected to the flow path for the fuel gas,
- the second flow path is connected to the flow path for the discharged cooling water,
- the third flow path is connected to the flow path for the cooling water to be supplied, and
- the fourth flow path is connected to the flow path for the oxidant gas.

* * * * *